(12) United States Patent
Astely et al.

(10) Patent No.: US 8,737,507 B2
(45) Date of Patent: May 27, 2014

(54) METHOD FOR TRANSMITTING OF REFERENCE SIGNALS AND DETERMINATION OF PRECODING MATRICES FOR MULTI-ANTENNA TRANSMISSION

(75) Inventors: David Astely, Bromma (SE); George Jöngren, Stockholm (SE); Muhammad Imadur Rahman, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 383 days.

(21) Appl. No.: 13/127,176

(22) PCT Filed: May 14, 2009

(86) PCT No.: PCT/SE2009/050542
§ 371 (c)(1),
(2), (4) Date: May 2, 2011

(87) PCT Pub. No.: WO2010/050874
PCT Pub. Date: May 6, 2010

(65) Prior Publication Data
US 2011/0205930 A1    Aug. 25, 2011

Related U.S. Application Data

(60) Provisional application No. 61/110,668, filed on Nov. 3, 2008.

(51) Int. Cl.
H04B 7/02    (2006.01)
(52) U.S. Cl.
USPC .......................... 375/267; 455/13.3; 367/138
(58) Field of Classification Search
None
See application file for complete search history.

(56) References Cited

U.S. PATENT DOCUMENTS

2006/0098754 A1*  5/2006  Kim et al. .................... 375/267
2006/0268623 A1  11/2006  Chae et al.

(Continued)

FOREIGN PATENT DOCUMENTS

EP       1909407 A1    4/2008
WO    2008/103805 A2    8/2008

OTHER PUBLICATIONS

Motorola, "A Structured Approach for Studying DL-MIMO Enhancements for LTE-A", TSG-RAN WG1 #54bis, Sep. 29-Oct. 3, 2008, Prague, Czech Republic, R1-083830.
Dahlman, E. et al., "Downlink multi-antenna transmission", 3G Evolution: HSPA and LTE for Mobile Broadband, Aug. 2008, Section 16.2.5, pp. 336-339, 2nd Edition, Academic Press.

(Continued)

*Primary Examiner* — Adolf DSouza
(74) *Attorney, Agent, or Firm* — Coats and Bennett PLLC

(57) ABSTRACT

Determining transmitter antenna weights at a base station having more available transmit antennas than the available number of reference signals can be performed by transmitting reference signals and receiving channel feedback data derived by a mobile terminal from the reference signals. The reference signals are each assigned to one of two or more antenna groupings, wherein at least a first one of the antenna groupings includes two or more transmit antennas, and transmitted using at least one transmit antenna from the corresponding antenna grouping. A first beam-forming vector for the first one of the antenna grouping is determined, and mapping the one or more data streams to the transmit antennas according to a final precoding matrix that depends on the channel feedback data and the first beam-forming vector is performed, to obtain a weighted transmit signal for each of the antennas.

16 Claims, 5 Drawing Sheets

(56) References Cited

U.S. PATENT DOCUMENTS

| | | | |
|---|---|---|---|
| 2007/0205955 A1* | 9/2007 | Korisch et al. | 343/853 |
| 2013/0022144 A1* | 1/2013 | Kotecha et al. | 375/267 |
| 2013/0122950 A1* | 5/2013 | Porat | 455/509 |

OTHER PUBLICATIONS

Dahlman, E. et al., "Multi-antenna techniques", 3G Evolution: HSPA and LTE for Mobile Broadband, Aug. 2008, Chapter 6, pp. 83-105, 2nd Edition, Academic Press.

* cited by examiner

METHOD FOR TRANSMITTING OF REFERENCE SIGNALS AND DETERMINATION OF PRECODING MATRICES FOR MULTI-ANTENNA TRANSMISSION

TECHNICAL FIELD

The present invention relates in general to the use of multi-antenna transmission techniques in cellular telecommunications system, and more particularly relates to techniques for transmitting reference signals and determining transmitter precoding matrices based on channel feedback data derived from the reference signals.

BACKGROUND

Multi-antenna techniques are currently being applied to several wireless systems to increase system reliability and/or system throughput. Those skilled in the art will appreciate that the highest performance gains from multi-antenna processing are obtained when multiple antennas are deployed at both ends of the wireless communication link. In best case scenarios, i.e., when channel conditions are separable between transmit and receive antennas and high signal-to-noise ratios are observed at the mobile terminal end of the communications link, two or more data streams can be transmitted simultaneously, at the same frequency, separated only in the spatial dimension. In less favorable scenarios (such as inseparable spatial channels or lower signal-to-noise ratios at the mobile terminals, etc), multi-antenna techniques can still be used to increase the link reliability via so-called spatial diversity and beamforming methods. In general, these systems with multiple antennas at both sides are referred to as Multiple-Input Multiple-Output (MIMO) systems.

The $3^{rd}$-Generation Partnership Project (3GPP) is currently developing specifications for a so-called Evolved UMTS Terrestrial Radio Access Network (E-UTRAN) as part of their Long-Term Evolution (LTE) initiative to improve radio access technology. The air interface described by these specifications, commonly referred to simply as LTE or E-UTRA (Evolved UMTS Terrestrial Radio Access), is intended to assure competitiveness of 3GPP-based access technology. Multi-antenna techniques are central to the 3GPP LTE standards; LTE supports several different multi-antenna techniques in order to enable high spectral efficiencies in a wide range of scenarios. In particular, a number of precoding formats are specified in the 3GPP Release 8 specifications.

Precoding is a technique for mapping modulated symbols onto multiple antennas for transmission either for spatial multiplexing or diversity or beamforming purposes. Precoding is used in multi-antenna systems to adapt the transmission to the short-term and/or long term properties of the channel. (See, for example, 3GPP TS 36.211, "Evolved Universal Terrestrial Radio Access (E-UTRA); Physical channels and modulation," v8.4.0, available at http://www.3gpp.org/ftp/specs/html-info/36211.htm.) The basic idea is to adjust the phases and/or the amplitudes of the information carrying signals transmitted from the multiple antennas so that the transmitted signals better suit the channel conditions between the multiple transmitter antennas and multiple receiver antennas. Classical beamforming is a special case of precoding in which the phase of a single information-carrying signal is adjusted on each transmit antenna so that all the transmitted signals add constructively at the receiver. However, precoding for MIMO systems can more generally be described as multiplying a vector-valued information-carrying signal with a precoder matrix.

The precoder matrix is chosen based on information about the channel properties. These channel properties, in turn, are measured by observing received reference signals, and comparing the received reference signals with known or expected values for these references. Of course, these measurements reflect channel characteristics corresponding to the particular MIMO channel over which the reference signal was sent. Thus, association of reference signals together with multi-antenna layers is very important. Based on this association, reference signals are used for measurement of various channel-related parameters; these parameters are crucial for selection of the best precoding matrix.

In LTE systems, cell-specific reference signals (also referred to as common reference signals), are transmitted during the first and fifth OFDM symbols of each slot when normal cyclic prefix and two antenna ports are configured. The cell-specific reference signals are transmitted during the first and fourth OFDM symbols when extended cyclic prefix is used. In LTE Release 8, at most four cell-specific reference signals are supported. Essentially, one, two or four common reference signals may be transmitted in a cell. Terminals use these reference signals to perform measurements for mobility as well as for channel estimation, so that the transmitted data and control signals can be demodulated and decoded. The common reference signals are also used by each terminal in the cell to determine the number of supportable downlink signals or streams that best suit the current channel conditions, and may be used as well as to determine recommended precoding weights for the base station to use for downlink transmission. The terminals also measure and feedback channel quality indicators to the base station; these channel quality indicators may be used for scheduling and link adaptation.

SUMMARY

Various embodiments of the present invention provide a way to make effective use of more transmit antennas at a base station (such as an LTE eNodeB) than the available number of reference signals, while still effectively exploiting instantaneous channel information at the base station. The techniques described herein may be used even when channel reciprocity does not hold, i.e., when uplink and downlink channels are uncorrelated relative to each other such that it is not possible to estimate certain parameters for downlink transmission from an uplink transmission.

A particular, but non-limiting, application of the inventive techniques disclosed herein is to support antenna configurations in LTE with more than four antennas, where the correlation of the corresponding channel coefficients is low between at least some of the antennas. This may be achieved while keeping the overhead associated with control signaling and cell-specific reference signals low.

An exemplary method of transmitting data to a mobile terminal from a plurality of transmit antennas thus includes transmitting a plurality of reference signals and receiving channel feedback data derived by the mobile terminal from the reference signals. The reference signals are each assigned to a corresponding one of two or more antenna groupings, wherein at least a first one of the antenna groupings comprises two or more transmit antennas, and transmitting each of the reference signals using at least one transmit antenna from the corresponding antenna grouping. The method further includes determining a first beam-forming vector for the first one of the antenna grouping and mapping the one or more data streams to the transmit antennas according to a final precoding matrix that depends on the channel feedback data and the first beam-forming vector, to obtain a weighted transmit signal for each of the transmit antennas.

In some embodiments, the transmit antennas are grouped so that propagation channel coefficients corresponding to each transmit antenna are more highly correlated within an antenna grouping than between any two transmit antennas from different antenna groupings. In these and other embodiments, the received channel feedback data includes an indicator corresponding to a recommended precoder matrix selected by the mobile terminal. In any of these embodiments, the final precoding matrix may be computed by calculating the Kronecker product of the recommended precoder matrix and the beam-forming vector.

In some embodiments, the beam-forming vector for the first one of the antenna groupings is determined by estimating a direction of arrival for uplink signals received from the mobile terminal. This may comprise, in some embodiments, determining a beam-forming vector for the first one of the antenna groupings by estimating a dominant eigenvector based on a long-term average of uplink channel statistics (i.e. second-order statistics of uplink channel).

In some embodiments, antenna groups other than the first group may also include two or more antennas. Thus, some embodiments of the invention may further include determining a second beam-forming vector for a second one of the antenna groupings and calculating the final precoding matrix based on the channel feedback data and both the first and second beam-forming vectors. In some embodiments, determining the second beam-forming vector may simply comprise re-using the first beam-forming vector for the second one of the antenna groupings. In others, the final precoding matrix may be calculated based on the channel feedback data and the average of the first and second beam-forming vectors.

A particular application of the inventive techniques described herein is to a base station comprising eight transmit antennas, where the transmit antennas comprise a dual-polarized four-column array and wherein first and second antenna groupings each comprise four co-polarized antenna elements.

Various apparatus configured to carry out the inventive techniques disclosed herein are also described in the detailed description that follows. Accordingly, embodiments of the present invention include a base station configured to transmit data to a mobile terminal from a plurality of transmit antennas, where the base station comprises a transmitter configured to transmit a plurality of reference signals, a receiver configured to receive channel feedback data derived by the mobile terminal from the reference signals, and a precoding processor. The transmitter is configured to assign each of the reference signals to a corresponding one of two or more antenna groupings, wherein at least a first one of the antenna groupings comprises two or more transmit antennas, and to transmit each of the reference signals using at least one transmit antenna from the corresponding antenna grouping. The precoding processor is configured to determine a first beam-forming vector for the first one of the antenna groupings and to map the one or more data streams to the transmit antennas according to a final precoding matrix that depends on the channel feedback data and the first beam-forming vector, to obtain a weighted transmit signal for each of the transmit antennas. Embodiments of the invention further include variants of this base station corresponding to the various methods noted above and discussed in further detail below.

Other features and advantages of the invention will become apparent from the following detailed description of the invention when considered in conjunction with the accompanying drawings and claims.

DETAILED DESCRIPTION

Figure 1:
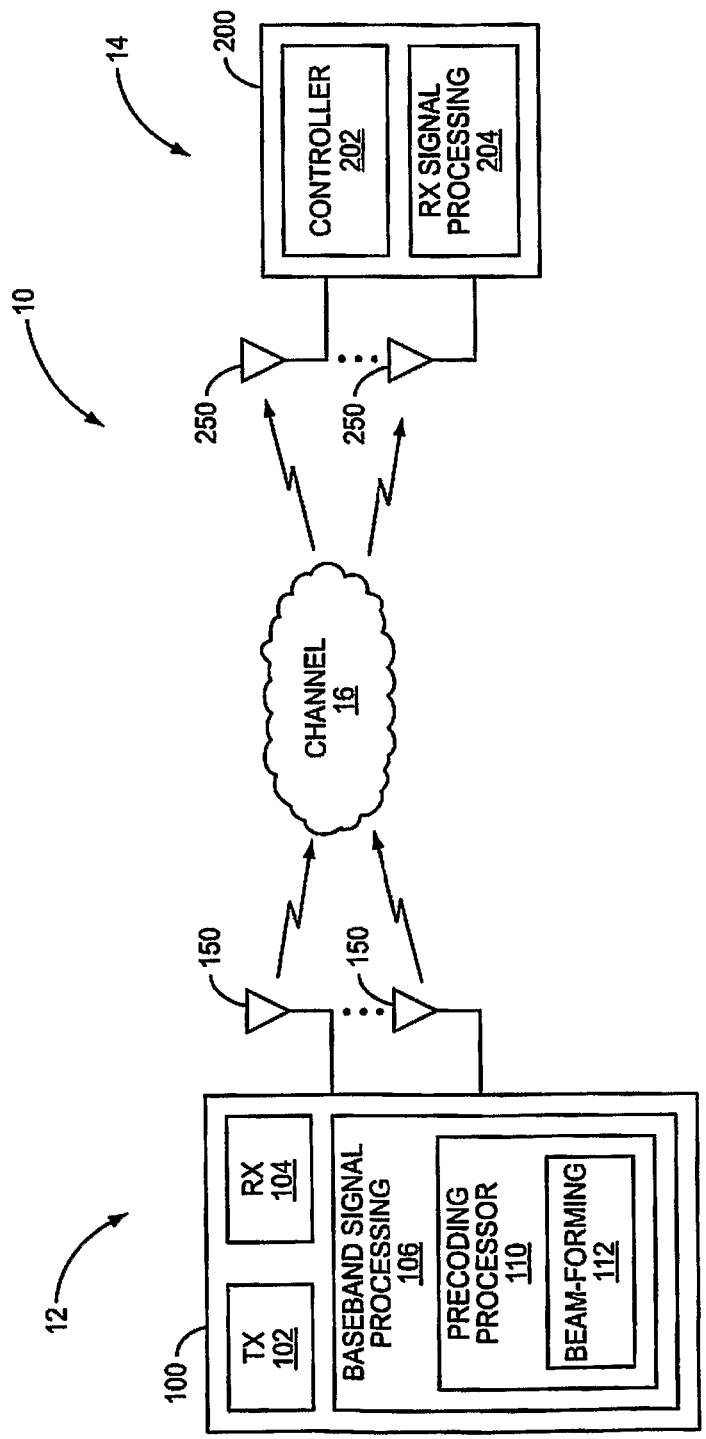
FIG. 1 is a block diagram of a wireless communications system.

In certain system installations, the use of more than four transmitter antennas at a base station is desirable. For instance, if antenna configurations developed for Time Division-Synchronous Code Division Multiple Access (TD-SCDMA) are re-used, then eight transmit antennas may be available. To support more than four transmit antennas, a so-called UE-specific reference signal has also been defined. ("UE" is used in 3GPP specifications and elsewhere to refer to "user equipment." As used herein, the terms "mobile terminal" and "mobile station", are generally used instead, and are intended to be interchangeable with the term "UE", although no limitation to 3GPP-related devices is intended.) Of course, UE-specific reference signals may be used with fewer than eight transmit antennas. In any event, in contrast to the cell-specific reference signals, the UE-specific reference signal is precoded with the same precoding weights as the data transmission and is used by only the mobile terminal receiving the accompanying traffic data.

In the current LTE specifications, there is no feedback reporting mechanism, in the sense that the mobile terminal measures channels and recommends precoding weights, when the system is configured using UE-specific reference signals. Instead, the eNodeB is expected to process received uplink signals and process them appropriately to obtain suitable precoding weights (also known as beamforming weights) for downlink transmission. Furthermore, in the case with UE-specific reference signals, only a single stream, or signal, can be transmitted in LTE Release 8 and hence there is currently no possibility to perform spatial multiplexing.

Current specifications for precoding signals in LTE systems are limited to a four-antenna codebook. The cell-specific (common) reference signals are also designed for a maximum of four-antenna case. Thus, the current specifications are unclear as to how to obtain and exploit instantaneous channel information in conjunction with UE-specific reference signals for the case of more than four antennas. In systems using frequency-division duplexing (FDD), the uplink and downlink channels are typically uncorrelated, and it is therefore not possible to estimate precoding weights for downlink transmissions based on channel conditions observed from uplink transmissions, unless the arrangement is such that the channels are correlated, in which case the correlation may be estimated and used to at least slowly adapt the downlink transmission.

For time-division duplexing (TDD) systems, on the other hand, there is a possibility to exploit the channel reciprocity and in this way obtain estimates of precoding weights that match the instantaneous channel. However, this is still problematic in the event that the terminal does not perform transmissions from all of the antennas that are used for reception. Furthermore, this approach does not account for interference properties at the terminal or the actual receiver strategy employed by the terminal.

Finally, several existing standards and systems, such as the TD-SCDMA systems mentioned above, use base station configurations with more than four (e.g., eight) transmitter antennas. In order to provide a clean migration path from these systems to LTE technology, strategies for fully exploiting these available transmitter antennas for beamforming are needed.

In summary, the current LTE Release 8 standard does not enable the use of instantaneous channel knowledge with more than four transmit antennas with UE-specific reference signals.

FIG. 1 is a simplified diagram of a wireless communications system employing multiple transmit antennas for transmitting one or more data streams to a mobile terminal. In one exemplary embodiment, wireless communications system 10 includes a base station node (eNode-B, in LTE parlance) 12, which includes a base station transceiver subsystem 100 and several antennas 150 (e.g., more than four). Base station transceiver 100 includes radio-frequency (RF) transmitter circuitry 102, RF receiver circuitry 104, and baseband signal processing circuitry 106. Baseband signal processing circuitry 106, which may be implemented using one or more appropriately programmed microprocessors, signal processors, specially designed digital and analog hardware, memory devices, and the like, includes a precoding processing unit 110 and a beamforming processor 112. Those skilled in the art will appreciate that the terms "processing unit" and "processor," as used herein, generally refer to functional elements that may in fact be implemented using one or more microprocessors, one or several application-specific integrated circuits, or the like. Thus, precoding processing unit 110 and beamforming processor 112 may be implemented using one device or several, and may be configured with appropriate program code, as necessary, to carry out the precoding and beamforming techniques described herein.

Signals transmitted from base station 12 travel through a propagation channel 16 to mobile terminal 14, which includes a mobile transceiver 200 and a plurality of receive antennas 250. Mobile transceiver 200 includes a controller 202 and receiver signal processing unit 204. Like baseband signal processing circuitry 106, controller 202 and receiver signal processing unit 204 may be implemented using one or more appropriately programmed microprocessors, signal processors, specially designed digital and analog hardware, memory devices, and the like, configured with appropriate program code to carry out communications with the base station 12 and to carry out the specific techniques described herein. The detailed construction and operation of mobile terminals and base station apparatus depends on the precise system or standards for which they are designed, and is generally well known to those skilled in the art. Accordingly, while details necessary to a full understanding of the present invention are disclosed herein, many other details are omitted.

Generally speaking, an information signal I(n) in the form of a binary data stream is input to the transceiver subsystem 100 at base station 12. The baseband signal processing circuit 106 performs error coding, maps the input bits to complex modulation symbols, and generates transmit signals for each transmit antenna 150. This processing includes precoding and beamforming processing, which will be described in further detail below. After upward frequency conversion, filtering, and amplification by RF transmit circuit 102, transceiver 100 transmits the transmit signals from respective transmit antennas 150 through the communication channel 16 to the mobile terminal 14.

Transceiver 200 at mobile terminal 14 includes a controller 202 to control operation of the transceiver 200 and a receive (RX) signal processing circuit 204. The RX signal processing circuit 204 demodulates and decodes the signal transmitted from the first station 12. The output signal from the receiver 200 comprises an estimate $\hat{I}(n)$ of the original information signal. In the absence of errors, the estimate $\hat{I}(n)$ will be the same as the original information signal input I(n) provided to the transceiver 100 for transmission.

Figure 2:
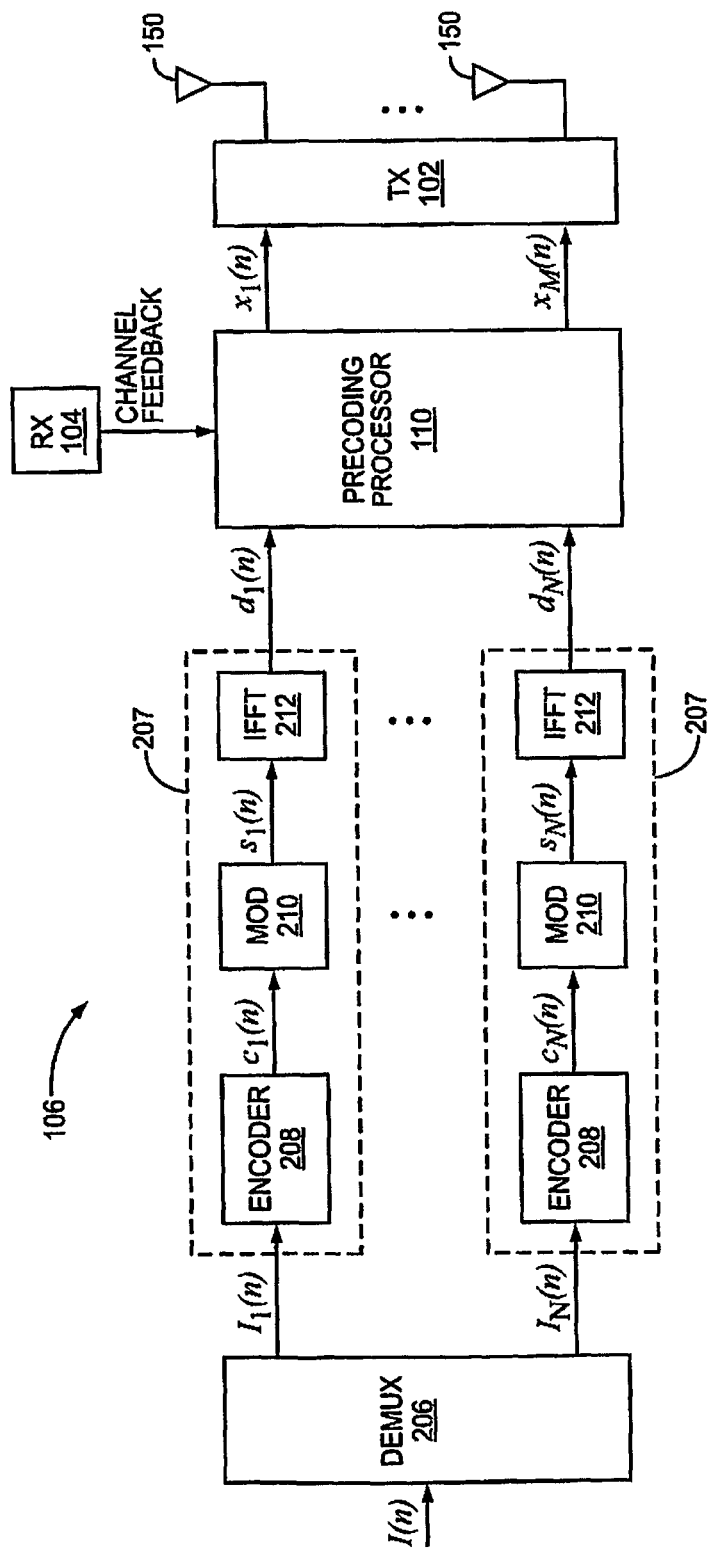
FIG. 2 is a block diagram of an exemplary transmitter circuit according to some embodiments of the present invention.

FIG. 2 illustrates exemplary details for a base station baseband processing circuit 106, according to some embodiments of the invention. Baseband processing circuit 106 comprises a demultiplexer 206, a plurality of channel coding circuits 207, and a precoding processor 110, which provides a plurality of precoded transmit data streams to transmitter circuit 102. An information bitstream I(n) is divided by demultiplexer 206 into N substreams $\{I_1(n), K\ I_N(n)\}$. Each substream $I_i(n)$ for i=1, L N is input to a corresponding channel coding circuit 207, which includes an encoder 208, a modulator 210, and an Inverse Fast Fourier Transform (IFFT) circuit 212. Encoder 208 comprises an error correction encoder, such as a Turbo encoder or convolutional encoder. The modulator 210 may comprise, for example a QPSK or QAM modulator, or both. The modulation symbol streams $\{s_1(n), K\ s_N(n)\}$ output by the respective modulators 210 are input to IFFT circuit 212, which includes a serial-to-parallel converter to divide the stream of modulation symbols $s_i(n)$ from the modulator 210 into $N_c$ substreams (where $N_c$ equals the number of subcarriers in the transmitted OFDM signal), an IFFT filter to apply an Inverse Fast Fourier transform as is known in the art, and a parallel-to-serial converter to generate an OFDM signal $d_i(n)$.

The OFDM signals $\{d_i(n), K\ d_N(n)\}$ output from the channel coding circuits 207 are input to the precoding processor 110, which maps the transmit signals to the M precoded transmit signals for upconversion and amplification by TX circuit 102 and transmission by antennas 150. As will be described in further detail below, the precoding circuit 110 maps the OFDM signals to the antennas using a final precoding matrix $W_P$, which has dimensions of N×M, and which is determined based on channel feedback information received from the targeted mobile terminal via receiver circuit 104.

Figure 3:
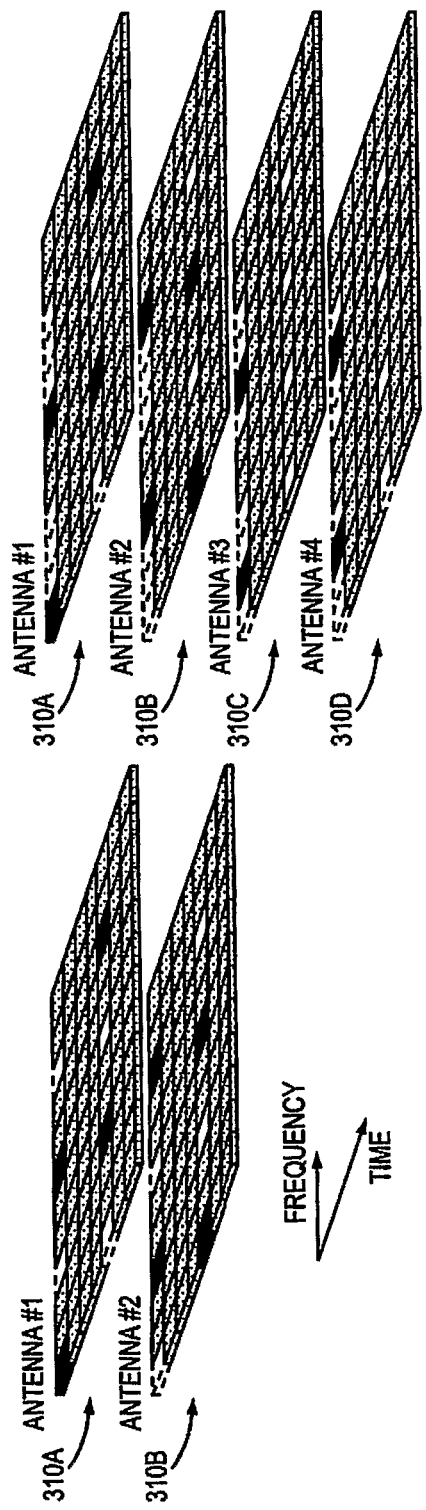
FIG. 3 illustrates the mapping of common reference signals to multiple antennas for an LTE system.

FIGS. 3A and 3B illustrate the placement of cell-specific reference signals in a downlink LTE resource block for a two-antenna configuration and a four-antenna configuration, respectively. In FIG. 3A, the downlink resource block 310A is mapped to a first antenna, and includes two cell-specific reference signals, corresponding to the solid time-frequency elements (resource elements) on each of the first and fifth OFDM symbols of the slot. (Those skilled in the art will appreciate that an actual OFDM signal may include many resource blocks, with cell-specific reference signals in each. This allows frequency-selective channel measurements to be made.) Downlink resource block 310B, mapped to a second antenna, has the same number of cell-specific reference signals, but mapped to different resource elements. Importantly, the resource elements in resource block 310B that correspond to cell-specific reference signals in resource block 310A are left vacant, and vice-versa.

FIG. 3B illustrates the mapping of cell-specific reference signals to downlink resource blocks 310A, 310B, 310C, and 310D, which are mapped to first, second, third, and fourth antennas respectively. The placement of cell-specific reference signals for the first and second antennas is identical to that pictured in FIG. 3A. The cell-specific reference signals for the third and fourth antennas are placed in other non-overlapping resource elements in the first OFDM symbol of the slot. In any given resource block, the resource elements dedicated to cell-specific reference signals in other resource blocks are left vacant.

Generally speaking, the techniques disclosed herein permit the use of more transmit antennas at a base station than can be uniquely assigned to cell-specific reference signals, while still permitting the exploitation of instantaneous channel information in the mapping of transmit signals to the antennas. In particular, these techniques may be used to support antenna configurations in LTE systems using more than four antennas. As discussed in more detail below, this may be done even when the channel coefficients for some of the antennas are uncorrelated to those of others. As will be seen, these techniques do not require significant increases in control signaling compared to conventional systems.

Figure 4:
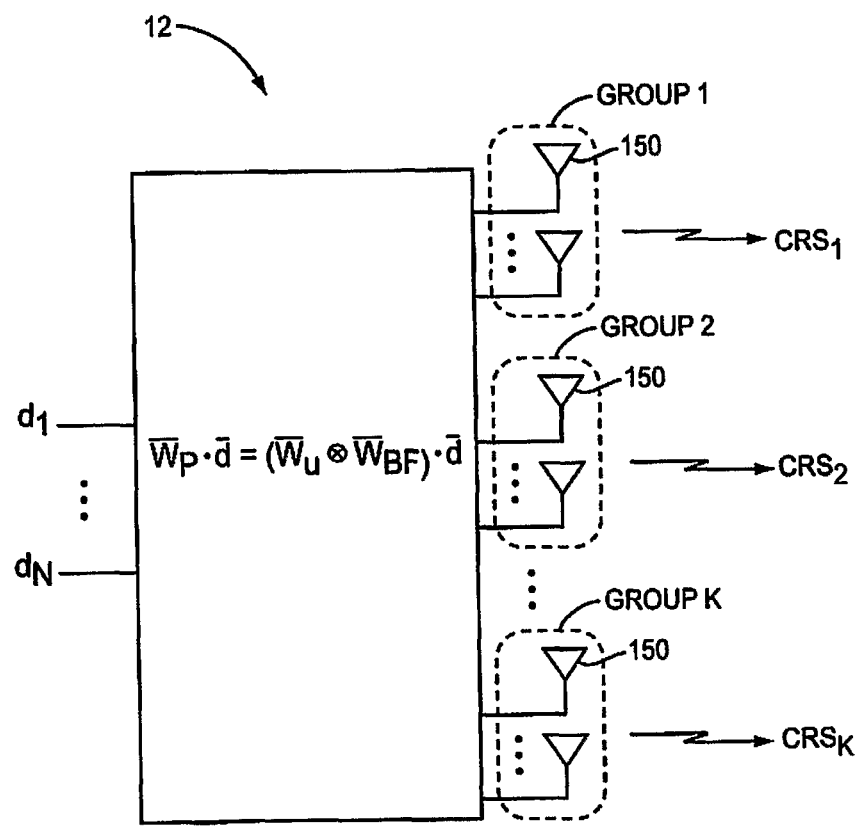
FIG. 4 illustrates a precoder and the mapping of common reference signals to groups of antennas.

One embodiment of the invention may be summarized briefly according to the following. First, the available transmit antennas at base station 12 are grouped into K groups, as shown in FIG. 4, with a corresponding cell-specific antenna port assigned to each of the groups. Thus, the M antennas 150 are grouped into groups 1 to K. As seen in FIG. 4, there is a one-to-one mapping between the antenna groups 1 to K and the cell-specific reference signals $CRS_1$ to $CRS_K$. More generally, it is possible that there be more than one cell-specific reference signal assigned to some groups.

The antenna groups are formed based on the degree of statistical dependence between the corresponding channel coefficients. One form of strong statistical dependency is high spatial correlation. Thus, two or more closely spaced antennas 150, having highly correlated channel coefficients, may be grouped into one of the K groups, while other antennas 150, perhaps spaced at further distances from the first two, are assigned to one or more other groups.

Within a particular antenna group, cell-specific reference signals are transmitted on a subset of antennas in the group, thereby providing information on relative phase differences between the groups to the mobile terminal. Although the cell-specific reference signals are associated with only a subset of antenna elements in the group, information about the channel coefficients of the other antenna elements in the same group may be derived by exploiting the above-mentioned in-group statistical dependency.

The mobile terminal uses the cell-specific reference signals per antenna group for measuring the relative phase differences between the groups and for assessing the channel characteristics in the downlink. In some embodiments, this information regarding the relative phase differences between the transmit antenna groups is used by the mobile terminal to determine a preferred precoder matrix $W_U$ from a set of available precoder matrices, and to recommend the preferred precoder matrix to the base station by sending one or several precoder matrix indicators (PMIs) to the base station. In these embodiments, channel quality indicators (CQI) may also be sent to the base station. In other embodiments, channel coefficient data and/or CQIs may be sent to the base station and used by the base station to select a preferred precoder matrix $W_U$. In either case, this information may be collectively regarded as channel feedback data.

The base station 12 (e.g., LTE eNode-B) determines a beamforming vector $W_{BF,i}$ for each antenna group, and then combines these beamforming vectors with the recommended precoding matrix $W_U$, e.g., as signaled by the mobile terminal, to find the final precoding matrix $W_P$ for the whole multi-antenna transmit array. The final precoding matrix $W_P$ is then used by the base station 12 to map the OFDM signals $d_i \ldots d_N$ to the M transmit antennas 150.

Various embodiments of the invention are thus applicable to antenna arrangements having two or more groups of antennas, with at least one of the groups having two or more antennas. Within a group having more than one antenna, the antennas may be intentionally placed in such a way that the fading is correlated. For example, a particular group may consist of antennas with the same polarization, placed relatively closely together (e.g., within one-half of a transmit signal wavelength). Uplink measurements may then be used to obtain transmission weights, i.e., beamforming weights, for downlink transmission within each group. This can be done, for example, by estimating a direction of arrival or dominant eigenvectors from a relatively long-term average of the channel statistics. Those skilled in the art will recognize this approach as eigen beamforming based on second order statistics.

From each group of antennas, at least one common reference signal is transmitted (e.g., from a single one of the antennas in the group) and the mobile terminal determines preferred precoding weights and possibly a channel quality estimate (CQI). The base station can then use the preferred precoding weights to co-phase the signals from different groups. The corresponding CQI may also be used to capture the gain of the beamforming within each group. The formulation of the final precoding matrix may in particular use the Kronecker-based precoder structure, as detailed further in the following examples. Those skilled in the art will appreciate that the Kronecker structure can take on many alternative and equivalent forms obtained by, for example, permuting the rows and columns of the resulting precoder matrix. Those skilled in the art will appreciate that different beamforming vectors may be used for each of the different antenna groups, implying a generalized version of the mentioned kronecker structure.

Without loss of generality, details of the technique described generally above may be illustrated with the several antenna configurations discussed in the following examples. In a first example, two groups of antennas with two elements each are considered. Accordingly, M=4, and K=2. In this case, the base station may be configured to transmit two cell-specific reference signals, e.g., one on antenna 1 (in group 1) and one on antenna 3 (in group 2). The two antenna groups may be installed with a large physical separation between them to ensure that these two groups of antennas experience different (relatively uncorrelated) instantaneous channel responses. The same can also be ensured by using orthogonal polarizations across these two groups, in which case a large physical separation will not be required.

In general, the mobile terminal need not be aware of the total number of antennas at the eNodeB. So, for the above example of two groups of two antennas, the mobile terminal can only recognize that two antennas are transmitting cell-specific reference signals. Based on these cell-specific reference signals, the mobile terminal determines a preferred precoder matrix $W_U$. Given current 3GPP LTE standards, $W_U$ will consist of any of the following for rank-1 transmission:

$$W_U \in \left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix} \right\}.$$

Of course, other "codebooks" for precoder matrices are possible. Although rank-1 cases are primarily discussed herein, to simply the notation, those skilled in the art will appreciate that the inventive techniques disclosed herein are readily extended to operations with higher ranks than rank 1.

After the mobile terminal signals the preferred precoder matrix to the base station, e.g., using a PMI, the base station can utilize $W_U$ to find the pre-coding weight vectors for each of the two antenna groups. These may be denoted as $W_1$ and $W_2$, respectively.

As a first step, the base station can determine beamforming weights for the concerned antenna group, e.g., it can determine $W_{BF,1}$ for antenna group 1 and $W_{BF,2}$ for antenna group 2. If some form of reciprocity is used for the beamforming vector determination, e.g., if direction-of-arrival (DOA)-based beamforming is used, then it may be assumed that $W_{BF,1} = W_{BF,2} = W_{BF}$. It is thus understood that the beamforming weights can be measured from any of the groups, or can be measured at both groups and then averaged to increase the beamforming reliability.

In this case, then, the final precoding matrix may be written as:

$$W_P = W_U \otimes W_{BF} = \begin{bmatrix} W_1 \\ W_2 \end{bmatrix} = \begin{bmatrix} W_{BF} \\ [W_U]_2 \cdot W_{BF} \end{bmatrix},$$

where $\otimes$ is the Kronecker product, and $[W_U]_2$ is the second element of $W_U$. (Note that $[W_U]_2$ is always equal to 1 in the example codebook given above.)

To illustrate in more detail, if the mobile terminal suggests that $$W_U = \begin{bmatrix} 1 \\ -1 \end{bmatrix}$$

and the base station determines that $$W_{BF} = \begin{bmatrix} a \\ b \end{bmatrix},$$

then the final precoding matrix may be written as:

$$W_P = \begin{bmatrix} a \\ b \\ -a \\ -b \end{bmatrix}.$$

For the rank-2 case (again, using the 3GPP LTE codebook, and assuming that K=2 and M=4), $W_U$ may be any of the following:

$$W_U \in \left\{ \begin{bmatrix} 1 & 1 \\ 1 & -1 \end{bmatrix}, \begin{bmatrix} 1 & 1 \\ j & -j \end{bmatrix} \right\}.$$

So, if the mobile terminal suggests $$W_U = \begin{bmatrix} 1 & 1 \\ j & -j \end{bmatrix}$$

and the base station again determines $$W_{BF} = \begin{bmatrix} a \\ b \end{bmatrix},$$

then the final pre-coding matrix may be written as:

$$W_P = \begin{bmatrix} 1 & 1 \\ j & -j \end{bmatrix} \otimes \begin{bmatrix} a \\ b \end{bmatrix} = \begin{bmatrix} a & a \\ b & b \\ ja & -ja \\ jb & -jb \end{bmatrix}.$$

The number of antennas in each group need not be identical. For example, consider the case where there are two antenna groups (K=2), but there are two statistically dependent antennas in the first group and three statistically dependent antennas in the second group. In this scenario, clearly, $W_{BF,1} \neq W_{BF,2}$. Those skilled in the art will note however, that the mobile terminal may be completely unaware that this scenario is different than the four antenna scenario discussed earlier, as only a single cell-specific reference signal need be transmitted for each group. In this case, if the base station determines the beamforming vectors $$W_{BF,1} = \begin{bmatrix} a \\ b \end{bmatrix}$$

and $$W_{BF,2} = \begin{bmatrix} c \\ d \\ e \end{bmatrix},$$

and if the mobile terminal suggests that $$W_U = \begin{bmatrix} 1 \\ j \end{bmatrix},$$

then the final precoding matrix can be written as:

$$W_P = \begin{bmatrix} a \\ b \\ jc \\ jd \\ je \end{bmatrix}.$$

The extension for rank 2 in this scenario can be done in a similar manner to that shown for above for the four antenna example. So, if the mobile terminal determines that the preferred precoding matrix is $$W_U = \begin{bmatrix} 1 & 1 \\ j & -j \end{bmatrix}$$

and the base station determines $W_{BF,1}$ and $W_{BF,2}$ as shown above, we can write that:

$$W_P = \begin{bmatrix} a & a \\ b & b \\ jc & -jc \\ jd & -jd \\ je & -je \end{bmatrix}.$$

Another possibility for a base station antenna configuration is that the antennas are organized into four antenna groups with two antennas in each group (i.e., K=4 and M=8). This case is very similar to the example given above for two groups of two antennas; a similar procedure can be applied for finding the final precoding matrix $W_P$. In this scenario, four cell-specific reference signals need to be transmitted, one for each group.

Given eight antennas, an exemplary implementation can be four pairs of 45-degree dual-polarized antennas, where the antennas spaced very closely together, e.g., at one-half of the transmit signal wavelength. If the antenna pairs are very closely spaced to one another, then the eight antennas may be divided into two groups of four, based on their antenna polarization criterion. According to a specific embodiment according to this exemplary implementation, a dual polarized four column array is used, as is used currently for TD-SCDMA. With this configuration, beamforming is performed within each polarization and co-phasing is established between the two polarizations to match the instantaneous channel to benefit from the full array gain. In such a case, there are K=2 groups, each group containing four co-polarized antenna elements.

Because the dual-polarized pairs are spaced very closely, the individual weights for the antennas in one of the groups ($W_1$, $W_2$, $W_3$, $W_4$) can be determined from observing an average channel correlation from uplink measurements, including a direction of arrival as a special case. However, the instantaneous relation between the two groups varies with the speed of the fast fading and can be difficult to obtain from uplink measurements (e.g., if FDD is used, or if TDD is used but the number of mobile terminal transmit antennas is lower than the number of receiver antennas). Thus, two cell-specific reference signals can be used, and by transmitting them from antennas with different polarization, such as the same column, the channel feedback data from the terminal will tell how to co-phase the signal(s) transmitted from all the two groups of co-polarized antennas.

Thus, for example, $W_U$ is selected by the mobile terminal from the two-antenna code-book, based on the transmitted cell-specific reference signals, and $W_{BF}$ is found in the base station for the four antenna elements of one group. Then, $W_1$ is simply designed as: $W_P = W_U \otimes W_{BF}$. Thus, for rank-1 transmission, if $$W_U = \begin{bmatrix} 1 \\ -j \end{bmatrix}$$

and the base station determines $$W_{BF} = \begin{bmatrix} W_1 \\ W_2 \\ W_3 \\ W_4 \end{bmatrix},$$

then we can write that:

$$W_P = [W_1, W_2, W_3, W_4, -jW_1, -jW_2, -jW_3, -jW_4]^T.$$

For rank-2 transmission, if the mobile terminal selects a recommended precoding matrix $$W_U = \begin{bmatrix} 1 & 1 \\ 1 & -1 \end{bmatrix}$$

and the beamforming vector $W_{BF}$ is the same as above, then the final precoding matrix is:

$$W_P = \begin{bmatrix} W_1 & W_1 \\ W_2 & W_2 \\ W_3 & W_3 \\ W_4 & W_4 \\ W_1 & -W_1 \\ W_2 & -W_2 \\ W_3 & -W_3 \\ W_4 & -W_4 \end{bmatrix}.$$

If the polarized pairs in the scenario described are instead largely separated in space, then we essentially have eight different antennas with uncorrelated channel responses in the system. Thus, we cannot support the transmission based on existing cell-specific reference signals based precoding techniques in LTE. However, it is understood that other antenna arrangements can be made based on this kind of dual-polarized antenna architecture for the eight transmitter antenna case.

Figure 5:
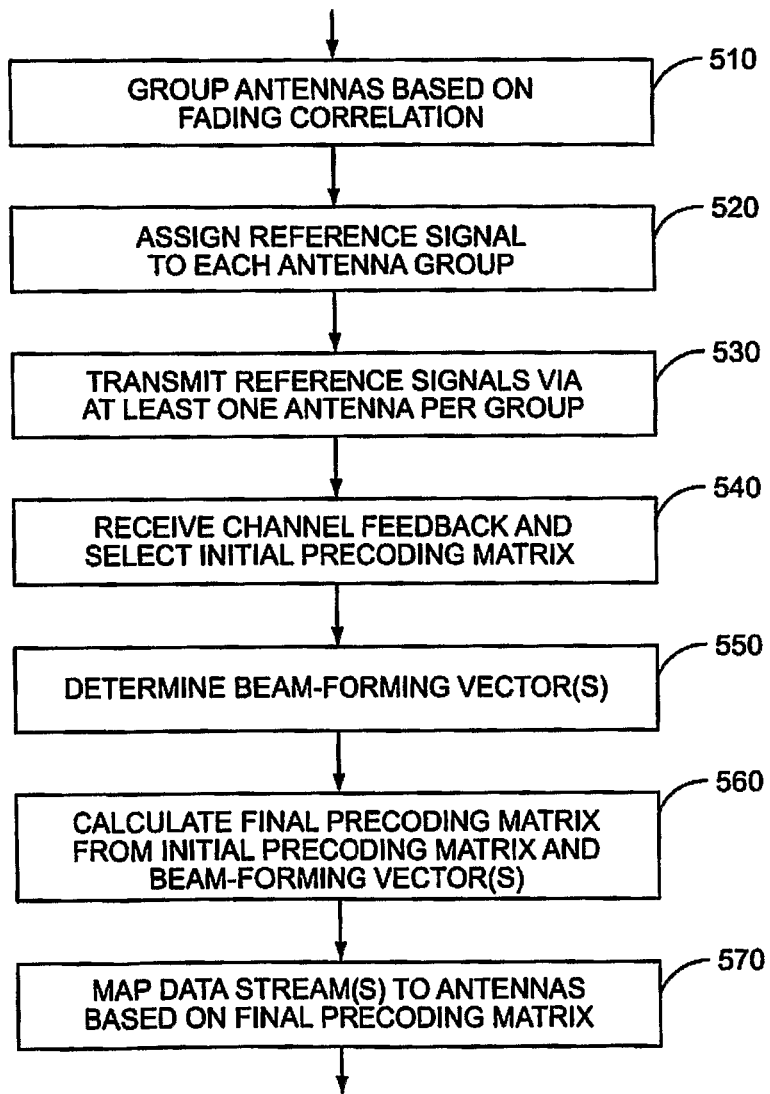
FIG. 5 is a process flow diagram illustrating an exemplary method for transmitting data from a plurality of transmit antennas, according to some embodiments of the invention.

With the above examples in mind, those skilled in the art will appreciate that FIG. 5 illustrates an exemplary method for determining a final precoding matrix according to some embodiments of the present invention. The process illustrated in FIG. 5 may be implemented, for example, at a base station (e.g., an LTE node-B), such as the base station 12 pictured in FIG. 1 and discussed above.

The process "begins", as shown at block 510, with the grouping of the available transmitter antennas based on their statistical cross-dependencies, e.g., their fading correlations. Of course, those skilled in the art will recognize that this grouping may be a one-time step, performed when the base station is built and/or configured. However, those skilled in the art will recognize that the exact groupings may be changed from time to time.

Given the groups, a reference signal, e.g., an LTE cell-specific reference signal, is assigned to each antenna group, as shown at block 520. The reference signal for each group is transmitted via at least one antenna per group, as shown in block 530. Of course, the reference signal for a given group may be transmitted on more than one antenna, particularly if an appropriate beamforming vector is already known, but the more general approach of transmitting the reference signals on a single antenna per group allows the system to determine a final precoding matrix without any initial knowledge of the targeted mobile terminal's direction.

As shown at block 540, the mobile terminal responds with channel feedback data, such as a pre-coding matrix indicator. Thus, the base station is now able to select an "initial" pre-coding matrix corresponding to the preferred matrix from the precoder matrix codebook.

As shown at block 550, the base station determines beamforming vectors for each group of antennas that includes more than one antenna. As suggested above, this process may use direction-of-arrival (DOA)-based beamforming techniques, where the transmission weights are determined assuming one dominant direction. The dominant direction can be estimated according to:

$$\hat{\theta} = \underset{w}{\operatorname{argmax}} \; a^H(\theta) R a(\theta),$$

where the beamforming weights w are given by $w=a(\hat{\theta})$, and where $a(\theta)$ is the steering vector for a given direction $\theta$. R is a covariance matrix, which can be determined with exponential averaging of the channel covariance matrix. The advantages of DOA-based beamforming are that the technique is relatively robust to mobility, and that only a single parameter needs to be estimated. However, there is some performance degradation when angle spread increases. Of course, those skilled in the art will appreciate that other techniques for determining an appropriate beamforming vector for a group of statistically related antennas may be used. Furthermore, those skilled in the art will appreciate that different beamforming vectors may be determined for each group of antennas. Alternatively, particularly if the relative configuration within a group is the same from one group to another, the same beamforming vector may be used for two or more groups.

Referring once more to FIG. 5, the illustrated process continues with the calculation of the final precoding matrix from the initial precoding matrix and the beam-forming vectors, as shown at block 560. As discussed earlier, this calculation may comprise the computation of the Kronecker product of the recommended precoder matrix and the beam-forming vector(s). At block 570, the final precoding matrix is used to map data streams to the transmit antennas for transmission to the mobile terminal.

As demonstrated above, embodiments of the present invention include methods and apparatus for obtaining and effectively using channel statistics for precoding data transmissions in a situation where the number of available transmitter antennas is larger than the available cell-specific reference signals. Thus, the techniques disclosed herein pave the way to use any number of available antennas from legacy system installations under the LTE reference signals framework, without requiring modification of the LTE standard. This is clearly beneficial when the need to use more than four antennas arises for LTE base stations, as it is generally desirable to reuse as much as possible of the existing LTE functionalities, such as transmission formats, control channels, CQI feedback, precoder structures, etc.

Along with this, regardless of the number of antennas present at the base station, embodiments of the invention provide a novel way to re-use the off-the-shelf preferred multi-antenna schemes as described in LTE standard, while all reference signals are transmitted through cell-specific beamforming network, i.e., with no user-specific reference signals required.

Of course, those skilled in the art will appreciate that although terminology from 3GPP LTE specifications has been used in this disclosure to exemplify the invention, this should not be seen as limiting the scope of the invention to only the aforementioned system. Other wireless systems, including WCDMA, WiMAX, UMB and GSM, may also benefit from exploiting the techniques described herein. Furthermore, it should also be noted that terminology such as eNodeB and UE, and the detailed discussions of transmission between a base station and a mobile terminal should be considering non-limiting, and in particular does not imply a certain hierarchical relation between the node that performs the precoding techniques described herein and the receiving node. Thus, for example, the inventive techniques may be applied to peer-to-peer transmission scenarios.

Accordingly, those skilled in the art will recognize that the present invention may be carried out in other ways than those specifically set forth herein without departing from essential characteristics of the invention. The present embodiments are to be considered in all respects as illustrative and not restrictive, and the present invention is limited only by the attached claims.

What is claimed is:

1. A method of transmitting one or more data streams to a mobile terminal from a plurality of transmit antennas, the method comprising:
   assigning each of a plurality reference signals to a corresponding one of two or more antenna groupings, wherein at least a first one of the antenna groupings comprises two or more transmit antennas;
   transmitting each of the reference signals using at least one transmit antenna from the corresponding antenna grouping;
   receiving channel feedback data derived by the mobile terminal from the reference signals, wherein the channel feedback data comprises an indicator corresponding to a recommended precoder matrix selected by the mobile terminal;
   determining a first beam-forming vector for the first one of the antenna groupings; and
   mapping the one or more data streams to the transmit antennas according to a final precoding matrix that depends on the channel feedback data and the first beam-forming vector, to obtain a weighted transmit signal for each of the transmit antennas;
   wherein the mapping the one or more data streams to the transmit antennas comprises computing the final precoding matrix by calculating the Kronecker product of the recommended precoder matrix and the beam-forming vector.

2. The method of claim 1, wherein the transmit antennas are grouped so that propagation channel coefficients corresponding to each transmit antenna are more highly correlated within an antenna grouping than between any two transmit antennas from different antenna groupings.

3. The method of claim 1, wherein determining a beamforming vector for the first one of the antenna groupings comprises estimating a direction of arrival for uplink signals received from the mobile terminal.

4. The method of claim 1, wherein determining a beamforming vector for the first one of the antenna groupings comprises estimating a dominant eigenvector based on an average of uplink channel statistics.

5. The method of claim 1, further comprising determining a second beam-forming vector for a second one of the antenna groupings and wherein said calculating comprises calculating the final precoding matrix based on the channel feedback data and the first and second beam-forming vectors.

6. The method of claim 5, wherein determining the second beam-forming vector comprises re-using the first beam-forming vector for the second one of the antenna groupings.

7. The method of claim 5, wherein said calculating comprises calculating the final precoding matrix based on the channel feedback data and the average of the first and second beam-forming vectors.

8. The method of claim 1, wherein the transmit antennas comprise a dual-polarized four-column array and wherein first and second antenna groupings each comprise four co-polarized antenna elements.

9. A base station configured to transmit data to a mobile terminal from a plurality of transmit antennas, comprising:
- a transmitter configured to assign each of a plurality of reference signals to a corresponding one of two or more antenna groupings, wherein at least a first one of the antenna groupings comprises two or more transmit antennas, and to transmit each of the reference signals using at least one transmit antenna from the corresponding antenna grouping;
- a receiver configured to receive channel feedback data derived by the mobile terminal from the reference signals, the channel feedback data comprising an indicator corresponding to a recommended precoder matrix selected by the mobile terminal;
- a precoding processor configured to determine a first beam-forming vector for the first one of the antenna groupings and to map the one or more data streams to the transmit antennas according to a final precoding matrix that depends on the channel feedback data and the first beam-forming vector, to obtain a weighted transmit signal for each of the transmit antennas;

wherein the precoding processor is configured to compute the final precoding matrix by calculating the Kronecker product of the recommended precoder matrix and the beam-forming vector.

10. The base station of claim 9, wherein the transmit antennas are grouped so that propagation channel coefficients corresponding to each transmit antenna are more highly correlated within an antenna grouping than between any two transmit antennas from different antenna groupings.

11. The base station of claim 9, wherein the precoding processor is configured to determine a beam-forming vector for the first one of the antenna groupings by estimating a direction of arrival for uplink signals from the mobile terminal.

12. The base station of claim 9, wherein the precoding processor is configured to determine a beam-forming vector for the first one of the antenna groupings by estimating a dominant eigenvector based on an average of uplink channel statistics.

13. The base station of claim 9, wherein the precoding processor is configured to determine a second beam-forming vector for a second one of the antenna groupings and to calculate the final precoding matrix based on the channel feedback data and the first and second beam-forming vectors.

14. The base station of claim 13, wherein the precoding processor is configured to determine the second beam-forming vector by re-using the first beam-forming vector for the second one of the antenna groupings.

15. The base station of claim 13, wherein the precoding processor is configured to calculate the final precoding matrix based on the channel feedback data and the average of the first and second beam-forming vectors.

16. The base station of claim 9, wherein the transmit antennas comprise a dual-polarized four-column array and wherein first and second antenna groupings each comprise four co-polarized antenna elements.

* * * * *